United States Patent [19]

Lowrey

[11] 4,171,228

[45] Oct. 16, 1979

[54] PIGMENT COMPOSITION FOR HIGH BUILD PROTECTIVE COATING

[76] Inventor: Hugh W. Lowrey, 510 Maple St., Birmingham, Ala. 35206

[21] Appl. No.: 959,516

[22] Filed: Nov. 13, 1978

Related U.S. Application Data

[63] Continuation-in-part of Ser. No. 688,055, May 19, 1976, abandoned.

[51] Int. Cl.$^2$ .............................................. C08K 7/24
[52] U.S. Cl. ........................... 106/288 B; 106/300; 106/304; 106/14.05; 428/306; 260/37 EP
[58] Field of Search .................. 106/288 B, 309, 300, 106/304, 40 V; 65/21

[56] References Cited

U.S. PATENT DOCUMENTS

| | | | |
|---|---|---|---|
| 2,574,972 | 11/1951 | Hill | 65/21 |
| 2,897,733 | 8/1959 | Shuger | 260/37 EP |
| 3,046,851 | 7/1962 | DeVries | 260/37 EP |
| 3,171,827 | 3/1965 | DeVries et al. | 106/288 B |
| 3,290,163 | 12/1966 | Elbreder | 106/288 B |
| 3,503,771 | 3/1970 | Krozer | 106/288 B |
| 3,888,691 | 6/1975 | Villani et al. | 106/40 V |
| 3,920,603 | 11/1975 | Stayner | 106/291 |
| 3,960,583 | 6/1976 | Netting | 106/288 B |
| 3,969,128 | 7/1976 | Urs | 106/288 B |

OTHER PUBLICATIONS

"Ecospheres, Hollow Glass and Ceramic-Microspheres-Microballoons," *Technical Bulletin* 14-2-1, Emerson & Cuming, Inc. Canton, Mass., Rev. 3/72.

*Primary Examiner*—Brian Hearn
*Attorney, Agent, or Firm*—Woodford R. Thompson, Jr.

[57] ABSTRACT

A pigment composition for high build protective coatings material comprising special combinations of pigments selected from a first group consisting of low density pigments of smooth nodular shape having a maximum particle size of 325 microns with not less than 40% by weight retained on a 325 mesh screen and a second group consisting of pigments having a median particle diameter ranging from 0.5 to 20 microns and being shaped so that not more than 20% by weight of the particles have ratios of any two dimensions exceeding 10. The total pigment volume concentration of the coating material is not less than 40% and the total volume of both groups of pigments is not less than 75% of the total volume of pigments in the coating material with a blend of both groups containing from 20 to 95% by volume of the first group of pigments and from 5 to 80% by volume of the second group of pigments.

7 Claims, No Drawings

PIGMENT COMPOSITION FOR HIGH BUILD PROTECTIVE COATING

CROSS-REFERENCE TO RELATED APPLICATION

This application is a continuation-in-part application of my prior co-pending application Ser. No. 688,055, filed May 19, 1976, now abandoned.

BACKGROUND OF THE INVENTION

This invention relates to a pigment composition for a high build protective coating such as paint.

Heretofore in the art to which my invention relates, pigment particle size has been limited by the practice considerations of pigment settling during the storage of liquid paint, and of protrusion of particles from thin paint films and the tendency of large particles to stop up spray application equipment. Commercial fillers designed for coatings seldom contain more than a very small fraction of particles which fail to pass a 325 mesh (44 micron) sieve. Because of these limitations protective coatings formulators have not taken full advantage of the phenomenon of particle packing, which is utilized by other workers in such diverse fields as selection of concrete aggregate and formulation of calking compounds. Efficient particle packing permits the formation of dense compositions which contain high volumes of aggregate or filler but which nevertheless have excellent physical properties. However, in order for particles to pack efficiently the particle size range must cover two orders of magnitude with substantial numbers of particles near both ends of the range. In order to meet this criterion using conventional paint pigments with their limited maximum diameters, formulators must employ major quantities of pigments having small particles of less than 0.5 micron diameter. The use of such fine particles increases the total particle surface area which retards flow, increases viscosity which reduces the non-volatile materials whereby more expensive materials are required and at the same time dispersion of the pigments is more difficult. Such small particle size pigments also lead to very short inter-particle distances which cause rapid failure of corrosion protection by film break-down during water immersion.

Definitions of the word "pigment", as used in the paint industry are set forth in the following publications: Webster's New International Dictionary, Second Edition, page 1860; Principles of Color Technology by Billmeyer and Saltzman, page 93 (Interscience, New York 1966); Federation Series on Coatings Technology, Unit 7, White Hiding and Extender Pigments, page 7 (Federation of Societies for Coatings Technology, Philadelphia, Pennsylvania, 1967); Paoint Technology Manuals, part 6, Pigments, Dyestuffs and Lakes (OCCA publication); Reinhold, New York, 1966); and, Pigment Handbook by Temple C. Patton, Volume 1, Page VII (John Wiley and Sons, New York, 1973).

SUMMARY OF THE INVENTION

In accordance with my invention, I go beyond previously accepted limits of good practice in the design of pigment blends for certain high build coatings. By proper blending of conventional pigments with relatively large but light-weight, smooth nodular-shaped pigments, significant increases in pigment loading have been achieved. That is, nodular-shaped pigments of ceramic, glass or polymeric compositions of approximately ten times the maximum diameter of conventional paint pigments have been combined with certain types of conventional pigments to form an improved pigment composition for use in high build protective coatings, such as paints. With this combination of selected pigments, efficient packing of pigment particles occurs to form a dense, impervious film containing a high proportion of low cost filler particles with no sacrifice of film integrity. Simultaneously, pigment surface area is minimized thus enhancing flow, avoiding high viscosity and permitting significant increases in paint solids and a decrease in volatile content. Also, nodular or spherical particle shape further enhances flow since it minimizes locking of particles in a crowded dispersed system. The problem of excessive protrusion from films does not arise when particles of the size which I employ are used in high build coatings, since film thickness is sufficient to prevent this. Conventional pigment particles of the size employed in accordance with my invention are impractical due to their high density which prevents satisfactory suspension in stored paints.

DETAILED DESCRIPTION

In accordance with my invention, I use a pigment composition for a high build protective coating material in which the total pigment volume concentration thereof is not less than 40% and preferably not less than 50% with the coating material being adapted to be stored after pigmentation in a liquid form. Also, the coating material has a minimum dry film thickness of approximately 100 microns per coat.

My improved pigment composition comprises two groups of pigments. The first group comprises smooth, nodular-shaped pigments having a maximum specific gravity of approximately 1.3 and a maximum particle size of approximately 325 microns with not less than 40% by weight retained on a 325 mesh screen. The second group comprises a group of generally nodular-shaped pigments having a median particle diameter ranging from approximately 0.5 to 20 microns when sieve analysis is performed by weight. The total volume of the first and second group of pigments is not less than 75% of the total volume of pigments in the coating material with a blend of the first and second groups of pigments containing from approximately 20 to 95% by volume of the first group of pigments and from approximately 5 to 80% by volume of the second group of pigments. Preferably, the total volume of the first group of pigments and the second group of pigments contains from approximately 30 to 90% by volume of the first group of pigments and from approximately 10 to 70% by volume of the second group of pigments.

In actual practice, I have found that smooth, nodular-shaped pigments, such as hollow or cellular microspheres of ceramic, glass or polymeric composition are satisfactory in every respect to form the first group of pigments described hereinabove. Microspheres have been known for many years and have been used for suppression of evaporation from petroleum storage and also have been adapted for use in plactic foam. Microspheres and process for producing the same are disclosed in the Veach et al U.S. Pat. Nos. 2,797,201, dated June 25, 1957; 2,978,340, dated Apr. 4, 1961; and 3,030,215, dated Apr. 17, 1962. Therefore, although the advantages achieved through my invention were widely sought, the adaption of materials and their proper combination were quite obscure and not apparent to formulators of protective coatings.

Useful pigments which may be employed to form the second group of pigments described hereinabove include relatively low-cost extenders or fillers which are produced from naturally occurring minerals by mechanical diminution of particles with subsequent size classification. The utilization of a broader range of particle sizes of extender pigments by combination of the two groups permits higher critical pigment volume concentrations with attendant advantages in high build coatings.

The preferred method of employing my improved pigment composition is to disperse, in a portion of the liquid medium, predetermined quantities of my Group II pigments by the use of any suitable dispersion equipment as commonly used in the manufacture of paint, and then to employ a high speed disperser, as commonly used in paint manufacture, to incorporate similarly predetermined quantities of my Group I pigments into the previously prepared liquid dispersion of Group II pigments. In view of the fact that the dispersion of pigments by this type of equipment is well known in the art to which my invention relates, no further description thereof is deemed necessary. The dispersion process must be controlled to avoid fracture of the nodular particles, such as microspheres, especially where the microspheres are cellular. After thus dispersing the pigments in the liquid medium, the balance of the liquid ingredients are added and the coating is strained through a properly sized screen.

It is well known that the proper selection of pigments has a profound influence on protective and other functional properties of protective coatings due to the fact that properly used fillers can provide barriers to the penetration of destructive materials. The advantages of my improved pigment composition begin with the generally accepted concept of the structure of a pigmented organic coating as a dispersion of pigment particles in an amorphous medium. The amount of medium present between the particles, and some important aspects of the behavior of the medium are determined by the number, size, degree of dispersion and surface characteristics of the particles. With a liquid medium only a portion of the liquid is considered to be free to move relative to the pigment particles, with the balance of the liquid, which is the portion adjacent the particle surfaces being immobilized to some degree by surface forces. The viscosity of a paint will be lower, the greater the proportion of the liquid medium that is free to move. The most universally important pigment property which influences viscosity is surface area per unit volume. This in turn is determined by particle size and shape. Accordingly, large relatively smooth particles, which have small surface area and adsorb less liquid, contribute to low viscosity at a high pigment loading, and for this ultimate advantage the particles should be nodular or spherical in shape. An additional advantage of nodular or spherical particles is that they minimize the tendency of particles to lock together and retard or prevent flow in a crowded dispersion.

It should be noted that maximum pigment loading is not attainable by simply using large nodular particles, such as spherical particles. In the dry film, as the proportionate volume of pigment is increased, a composition is reached beyond which there is insufficient medium to completely coat the particles and fill the interstices between them. A further increase in pigment volume concentration (PVC) will result in a sharp decline in protective properties. The volume fraction of the dry film which is composed of pigment, at this critical point, is referred to as the critical pigment volume concentration (CPVC). Paints having pigment volume concentrations above this critical point contain voids or air spaces after they are applied, even though sufficient solvent was present before application to fill the voids. Accordingly, when my pigment composition is incorporated in a high build protective coating material, I prefer to have a pigment concentration which is no greater than the critical pigment volume concentration.

Maximum values of critical pigment volume concentration require the use of large smooth pigment particles, but smaller particles are also required to permit efficient pigment packing by filling voids between the larger particles. For high efficiency, carefully selected particle size distribution is required, which contains as major constituents, my two groups of particles having different diameters by one to two orders of magnitude. Furthermore, particle shape should be isometric.

The application of high build coatings by hydraulic airless spray requires the selection of a spray orifice to deliver paint at the desired rate. Also, in-line filters must be provided to remove oversize particles and foreign materials which might otherwise clog the orifice. The presence of nodular or rounded particles having a maximum particle diameter of 325 microns necessitates the use of larger orifices and coarser filters. Also, the paint or coating composition must be strained during manufacture through screens selected to control maximum size of the particles present. Also, the pigments employed in high build coatings must have sufficient strength to withstand the shear and impact forces encountered during airless spray application.

High build coatings could employ larger particles of conventional pigments than heretofore employed were it not for the difficulty of keeping such particles in suspension during storage of the liquid coating. The importance of particle diameter in determining rate of settling is indicated by the Stokes law equation for the velocity of a spherical particle settling through a liquid, the equation being as follows:

$$v = \frac{2r^2 g (\rho p - \rho l)}{g \eta}$$

where
V = velocity of settling
r = radius of particle
$\rho p$ = density of particle
$\rho l$ = density of liquid
g = acceleration of gravity
$\eta$ = viscosity of liquid Instead of employing conventional pigment suspensions wherein the large particles have specific gravities ranging from 2 to 5, I employ specific gravities no greater than 1.3 in forming my first group of pigments. That is, the low density, nodular particles of the desired large particle size are blended with conventional pigments of much smaller particle size to privide my improved pigment composition. My invention thus allows the utilization of a higher volume of pigment per unit volume of the dry paint film than has heretofore been attainable. I accomplish this without sacrifice of film integrity because of efficient packing of pigment particles covering a wide range of relatively large diameters.

Simultaneously, because the pigments employed have small surface areas, my invention allows the utilization of a high volume of pigment per unit volume of liquid paint. Since the pigments employed contribute less viscosity per gallon of non-volatile material than do most binders, the result is to allow an increase in non-volatile content in the paint without viscosity increase.

When hollow microspheres are employed as Group II pigments, the specific gravity may be low enough, by comparison with that of the liquid medium, to cause the microspheres to float to the top, where an objectionable crust may form. In practice, it has been found that additives and techniques which are commonly employed to control the settling of conventional pigments will also control floating of microspheres. Excessive thinning prior to paint application is always inadvisable in high build coatings because it interferes with attainment of desired film thickness. In high build coatings which contain low density microspheres, excessive thinning is to be avoided for the additional reason that floating of microspheres may occur.

An example will illustrate the advantages of using my mixture of pigments. When a high build epoxy coating is prepared using as the sole pigment crystalline silica of conventional particle size with most particles below 10 microns in diameter, the CPVC is 61%. Substituting microspheres of median particle diameter 80 microns does not significantly alter the CPVC. However, a mixture of the two in a 30 to 70 ratio by volume affords a CPVC of 68% and allows an increase in total non-volatile content of the paint, expressed by volume, of 14%.

Examples of high build protective coatings formed in accordance with my invention are shown below along with a description of the pigments employed in the examples:

Group I Pigments

Ceramic Microspheres
  Specific gravity: approximately 0.7
  Shape: hollow or cellular spheriods with smooth surfaces
  Particle size:
    Retained on 60 mesh screen: 1% maxium by weight
    Retained on 325 mesh screen: 98% by weight
  Strength: less than 10% of spheres collapse under 750 lb. per square inch isostatic pressure.
Glass Microspheres
  Specific gravity: approximately 0.28
  Shape: hollow spheres with smooth surfaces
  Particle size:
    Retained on 100 mesh screen: 2% by weight
    Retained on 325 mesh screen: 82% by weight
  Strength: less than 10% of spheres collapse under 750 lb. per square inch isostatic pressure.

Group II Pigments

Barytes (natural barium sulfate)
  Shape: generally nodular
  Median particle diameter: 8.5 microns
Air Floated Kaolloid Clay
  Shape: stacked plates
  Median particle size: about 10 microns

Other Pigments

Titanium Dioxide (chloride process rutile)
  Median particle diameter: less than 0.3 microns
Attapulgite
  Shape: acicular
  Mean particle size: 0.14 microns
Pyrogenic Silica
  Median particle diameter: less than 0.02 microns

EXAMPLE NO. 1

| High Build Two Component Epoxy-Polyamide Coating | |
|---|---|
| Pigmented Epoxy Component | |
| Ingredients | Percent by weight |
| Titanium dioxide | 3.4 |
| Barytes | 38.7 |
| Kaolloid Clay | 9.7 |
| Glass microspheres | 5.8 |
| Pyrogenic silica | 0.7 |
| Castor oil-derived thixotropic additive ("MPA". A proprietary product of NL Industries) | 0.4 |
| Butylated urea-formaldehyde resin | 0.8 |
| Epoxy resin (polymeric ether, a product of the reaction of epichlorohydrin and bisphenol "A". Epoxide equivalent weight 525) | 20.4 |
| Methyl isobutyl ketone | 4.5 |
| Ethylene glycol ethyl ether | 2.6 |
| Xylene | 12.6 |
| n-Butanol | 0.4 |
| | 100.0 |
| Clear Polyamide Component | |
| Ingredients | Percent by weight |
| Reactive polyamide resin, amine value 330–360 | 65.3 |
| Xylene | 34.7 |
| | 100.0 |

PROCEDURE FOR PREPARATION OF HIGH BUILD EPOXY-POLYAMIDE COATING

The epoxy resin is purchased as a solution at 75% non-volatile in the methyl isobutyl ketone and a portion of the xylene. The urea-formaldehyde resin is purchased as a solution at 50% non-volatile in the butanol and a portion of the xylene. To prepare the pigmented component, the urea-formaldehyde solution is combined with two-thirds of the epoxy solution and the glycol ether is added. While agitating on a high speed disperser commonly used in the manufacture of paint, all of the pigments except the microspheres are added. Also the thixotropic additive, and xylene are added as required for proper consistency. Agitation is continued for at least twenty minutes and until the batch temperature reaches at least 120° F. The microspheres and the balance of the epoxy solution are then added. After agitating for ten minutes, the remaining ingredients are added and agitation is then continued until homogeneous. The composition is then strained through a 50 mesh screen.

To prepare the clear component, the polyamide resin is dissolved in the xylene using a suitable mechanical mixer.

To prepare the coating for application, nine parts by volume of the pigmented component is mixed one part by volume of the clear component. The coating should be used within eight hours at normal ambient temperature. A prefered method for the use of this coating on steel which has been prepared by abrasive blast is to apply two coats of at least eight mils dry film thicness per coat, with each coat being applied by hydraulic airless spray.

EXAMPLE NO. 2

High Build Vinyl Coating for Steel

| Ingredients | Percent by weight |
|---|---|
| Titanium dioxide | 5.2 |
| Attapulgite | 2.6 |
| Barytes | 15.4 |
| Kaolloid clay | 3.1 |
| Ceramic microspheres | 5.0 |
| Castor oil-derived thixotropic additive ("MPA". A proprietary product of NL Industries) | 0.8 |
| Vinyl resin (Copolymer containing 1% interpolymerized maleic acid, 84 to 87% vinyl chloride and 12 to 15% vinyl acetate, by weight) | 7.1 |
| Vinyl resin (Copolymer containing 89.5 to 91.5% vinyl chloride, 2.0 to 5.5% vinyl acetate and 5.3 to 7.0% vinyl alcohol by weight) | 7.3 |
| Bis (2-ethylhexyl) phthalate | 3.3 |
| Methyl isobutyl ketone | 13.8 |
| Xylene | 19.4 |
| 2-Nitropropane | 17.0 |
| | 100.0 |

PROCEDURE FOR PREPARATION OF HIGH BUILD VINYL COATING

The two vinyl resins are dissolved in the blend of xylene, methyl isobutyl ketone and 2-nitropropane. This resin solution is loaded into a pebble mill with all the pigments except the ceramic microspheres and is ground for 24 hours whereupon it is then removed from the mill. The microspheres are then added while agitating on a high speed disperser. High speed agitation is continued for ten minutes and then the bis(2-ethylhexyl) phthalate is added. The composition thus formed is mixed until homogeneous and then strained through a 50 mesh screen.

A preferred method for the use of this coating is to apply one coat of at least six mils dry film thickness, by hydraulic airless spray, to steel which has been prepared by abrasive blast. Apply at least one additional coat of two mils dry film thickness, consisting of a conventional vinyl coating. A typical such coating contains the same vinyl resins, plasticizer and solvents as shown in Example 2, with titanium dioxide as the sole pigment. One pound of titanium dioxide is used per pound of vinyl resin, and the total non-volatile content of the coating, by volume, is 20%. Techniques for the formulation and preparation of such coatings are well known to those skilled in the art.

| Compositional Constants of High Build Coatings in Examples | Example 1 Epoxy | Example 2 Vinyl |
|---|---|---|
| Pigment Volume Concentration, percent | 60.0 | 50.0 |
| Total volume of Group I pigments plus Group II pigments as percent of total volume of pigment | 96.5 | 83.2 |
| Composition of the blend of Group I and Group II pigments, as percent by volume | | |
| Group I | 62.0 | 60.0 |
| Group II | 38.0 | 40.0 |

From the foregoing description, it will be seen that I have devised an improved pigment composition for high build protective coatings. By providing correctly proportioned blends of large particle size, lightweight, nodular pigments with smaller particle size pigments, I increase the critical pigment volume concentration to thus provide a high non-volatile content and a lighter weight than could otherwise be achieved. That is, with conventional pigments heretofore employed, the critical pigment volume concentrations might range from 45 to 60% whereas in accordance with my invention I increase the critical pigment volume concentration to approach and sometimes exceed 70%. High CPVC coupled with low viscosity permits low volatile content, which in turn minimizes the use of volatile solvents. The final in place cost of paints which employ my invention is lower, not only due to the fact that a large volume of low cost pigments is used, but more importantly because film shrinkage during curing is lower. The cost of each gallon of paint and the labor and overhead cost of painting each unit area, provide a greater thickness of protective film. At the same time, the potential for air pollution and consumption of limited petroleum resources are reduced.

In addition to solving the problem of suspending large particles the use of low density pigments typically reduces the weight of a gallon of paint by 2 to 4 pounds, thus reducing the cost of containers as well as shipping and handling costs.

Also, by providing a pigment composition in which the pigment particles are closely packed, I enhance the ability of the coating to resist the penetration of destructive liquids and gases which must make their way by diffusion through the binder, following a circuitous route around the numerous particles. It has been found that excessive crowding of pigments which tend to accumulate moisture at hydrophilic sites on the particle surfaces leads to rapid increase in water penetration and corrosion, due to rupture of the binder membranes separating pigment particles. Since inter-particle distances are greater at critical pigment volume concentration with larger particle pigments, additional advantages are realized in accordance with my invention, where efficient pigment packing is achieved without the use of very small particles. However, it is necessary in formulating heavily pigmented systems containing large particles, to select pigments and binders which form strong adhesive bonds with each other, and to achieve efficient wetting of the pigment in order to avoid channeling of corrosive agents along particle surfaces. As is generally the case with anti-corrosive coatings, multi-coat systems of adequate total film thickness are advisable.

Since adhesion and film strength tend to peak at critical pigment volume concentration, my improved pigment composition increases resistance of the paint film to direct impact. A second mechanism for improvement of impact resistance, in coatings which contain glass or ceramic microspheres, is absorption of energy by crushing of these spheres, without film rupture. Also, since my improved pigment composition comprises a greater volume of the non-volatile film-forming portion of a paint, due to the volume occupied by the pigments, the ratio of volatile thinner to binder is higher, and therefore it is possible to employ binders of higher viscosity in paints which have a high total non-volatile content. Flexibility in selection of binders combines with favorable application characteristics to permit formulation of coatings which are exceptionally easy to apply, thus reducing application costs and improving the quality of application so that the coating provides better and longer service.

Additional advantages are realized from my improved pigment composition due to the fact that the large lightweight particles are not abrasive to spray equipment as many other materials of similar particle size would be. Also, the use of my pigment composition in coatings characterized by very tough, hard films which are highly resistant to aggressive environments renders such coatings less subject to the problem of delamination of subsequent coats. This permits structural steel components to be coated in a fabrication shop, thereby reducing the need for expensive surface preparation when additional paint is applied in the field after erection of the structure. When recoating is delayed so long that an abrasive blast is required to render the surface recoatable, I find that my improved pigment composition employing microspheres makes surface preparation easier because the outer surface of the microspheres may be removed by abrasive blast. That is, high speed abrasive particles will break and remove the exposed portion of each hollow sphere lying on or near the surface, leaving the inside of the embedded portion exposed. This newly exposed surface presents an excellent site for paint adhesion and represents a substantial portion of the total surface area after blasting.

I wish it to be understood that I do not desire to be limited to the precise examples, proportions or embodiments herein disclosed for obvious modifications will occur to a person skilled in the art.

What I claim is:

1. In a pigment composition for use in a high build protective coating material in which the total pigment volume concentration thereof is not less than 40% with said coating material being adapted to be stored after pigmentation in a liquid form and to produce a minimum dry film thickness of approximately 100 microns per coat:
   (a) a first group of smooth, nodular shaped pigments having a maximum specific gravity of approximately 1.3 and a maximum particle size of approximately 325 microns with not less than 40% by weight retained on a 325 mesh screen,
   (b) a second group of generally nodular shaped pigments having a median particle diameter ranging from approximately 0.5 to 20 microns when sieve analysis is performed by weight, and
   (c) the total volume of said first group of pigments and said second group of pigments being not less than 75% of the total volume of pigments in said coating material with a blend of said first group of pigments and said second group of pigments containing from approximately 20 to 95% by volume of said first group of pigments and from approximately 5 to 80% by volume of said second group of pigments.

2. A pigment composition as defined in claim 1 in which the total pigment volume concentration in said coating material is not less than 50%.

3. A pigment composition as defined in claim 1 in which said first group of pigments are generally rounded in shape.

4. A pigment composition as defined in claim 3 in which said first group of pigments are also cellular.

5. A pigment composition as defined in claim 1 in which said total volume of said first group of pigments and said second group of pigments contain from approximately 30 to 90% by volume of said first group of pigments and from approximately 10 to 70% by volume of said second group of pigments.

6. A pigment composition as defined in claim 1 in which said second group of pigments are shaped so that not more than 20% by weight of the particles have ratios of any two dimensions exceeding 10.

7. A pigment composition as defined in claim 1 incorporated in said high build protective coating material in which the pigment volume concentration is no greater than the critical pigment volume concentration.

* * * * *